INVENTOR
LEONARD POMPA

United States Patent Office 3,301,356
Patented Jan. 31, 1967

3,301,356
SLOTTED BRAKE DISC
Leonard Pompa, Ardmore, Pa., assignor to Lukens Steel Company, Coatesville, Pa., a corporation of Pennsylvania
Filed Feb. 17, 1965, Ser. No. 433,296
1 Claim. (Cl. 188—218)

This invention relates to a vehicle brake disc, particularly an airplane brake disc, wherein extreme mechanical and heat stresses are encountered.

In the formation of brake assemblies it is the usual practice to provide a plurality of discs so that braking pressure can be exerted on a series of discs between plates. The discs at that time are subjected to extreme friction and heat conditions so that mechanical and thermal stresses develop almost instantaneously. These stresses occur when an airplane is braked during landing. Unless the discs are properly designed, the stresses can develop unevenly and the individual discs will become distorted through local or uneven shrinkage and expansion.

Prior art attempts to relieve stress have resulted in brake disc designs in which relief slots are provided in the face of the disc. Generally, the relief slots are positioned radially relative to the axis of the disc.

However, studies of discs which have failed in service indicate that there are two major directions of stress which must be relieved, radial and circumferential. In general, mechanical braking stresses are biaxial and thermal expansion and contraction, due to heat cycling in the frictional engagement areas of the disc, also induce or augment stresses in both directions. The distortion is evidenced when wave patterns form on the disc or if the normally flat disc becomes dish-shaped. Such distortions reduce braking efficiency because the discs no longer interfit with one another and the plates in the assembly. Also, extreme overheating in one area can result in brake failure if either cracking or fusion between discs and plates occurs.

The brake disc of the instant invention has slots which are multidirectional, or slots which are generally concentric but which include portions that extend transversely to the concentric direction. The multidirectional slots are designed to relieve biaxial stresses rather than uniaxial stress.

It is an object of the present invention to provide a brake disc with slots that resist or relieve biaxial stress generated during service.

It is another object to provide a slotted brake disc that will minimize heat stresses generated by mechanical braking stresses and thermal expansion and contraction.

It is a further object of the present invention to provide a brake disc which has multidirectional relief slots that prevent distortion and disc failure.

These and other objects will be apparent from the following description and accompanying drawings.

Figure 1:
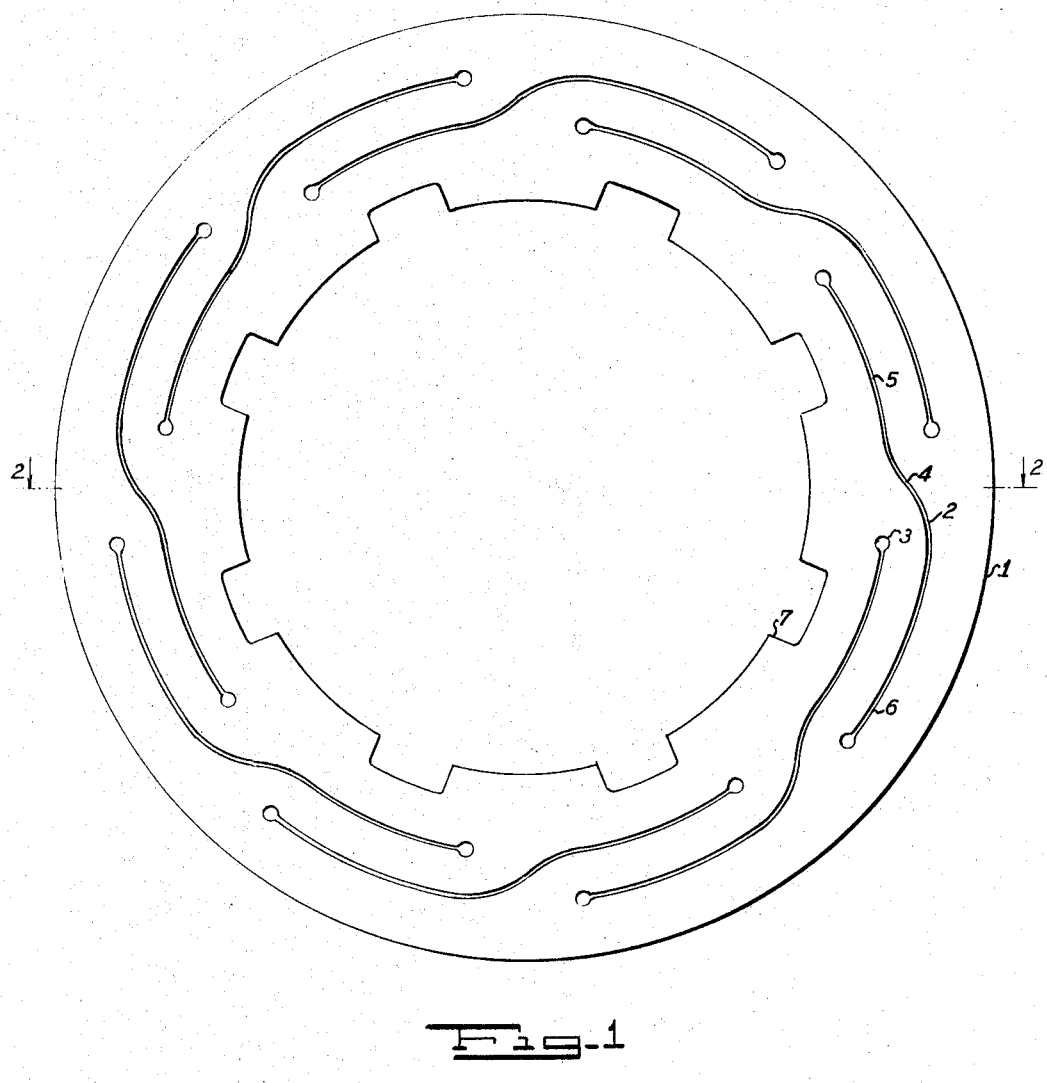
Figure 2:
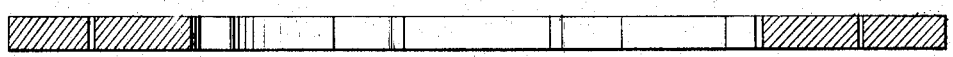
Figure 2:
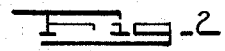

FIG. 1 is a plan view of the disc.
FIG. 2 is a side view of the disc in section.

Brake disc 1 is formed of conventional materials, iron or steel being preferred. The disc is an annular rim or ring surrounding an inner space. The inner periphery of the rim is provided with a series of notches 7 for mounting and fitting or keying the disc on a rotating body. A plurality of elongated multidirectional slots 2 are formed in the disc to extend substantially concentrically with respect to the rim. It is the usual practice to arrange slots radially in brake discs. In the instant invention the relief slots are arranged so that the major portions of the slots are generally concentric with respect to the disc. However, the slots extend in more than one direction so that portions are substantially transverse to the concentric direction.

Each slot is provided with a leading portion 6 (when considered clockwise in FIG. 1) and a trailing portion 5, both of which are substantially concentric relative to the rim. Each portion terminates in an enlarged, substantially round opening 3. A preferred arrangement is to have the leading portion of a slot overlap the trailing portion of a preceding slot. Also, each slot includes a middle section which comprises a further portion 4 joining the leading and trailing portions. The further portion 4 extends in a direction substantially transverse to the concentric direction or to the concentric portions. Also, the portions 4 of the slots are preferably located between the openings 3 of a leading portion and a trailing portion. It is preferred that the further portions 4 connect the concentric portions but it is to be understood that portions 4 can be located elsewhere in the slots.

The relief slots as referred to in the drawings are stated to have directionality in terms of leading and trailing portions. It is to be understood, however, that the particular direction of the slots with reference to assembly has only a minor factor in its performance. Hence it is not necessary to stack or assemble the discs with any particular orientation of the slots.

While the total slot length or the total disc area allocated to the slots is somewhat greater in the instant invention as compared with prior art designs, this feature has the advantage of permitting relatively easy removal of abraded material. Thus it is possible to maintain a more consistent braking performance during the life of a brake assembly of these discs.

The foregoing detailed description has been given for clearness of understanding only, and no unnecessary limitations should be understood therefrom, for further modifications will be obvious to those skilled in the art.

Having described my invention, what I claim as new and desire to secure by Letters Patent is:

A brake disc comprising an annular rim surrounding an inner space, said rim having a plurality of substantially identical elongated slots therein, said slots being entirely confined between the edges of said rim, each of said slots having two portions substantially concentric to said disc, one of said portions being a leading portion and the other of said portions being a trailing portion and a further intermediate curved portion connecting said leading and trailing portions, said intermediate curved portion extending in a direction generally transverse to said concentric portions, the leading portion of one slot overlapping the trailing portion of a preceding slot whereby said disc is divided into a plurality of overlapping sections which join one another adjacent the inside diameter and the outside diameter of said rim and said overlapping sections are free to move independently through the middle of said disc.

References Cited by the Examiner
UNITED STATES PATENTS

| 2,851,139 | 9/1958 | Dietz | 192—107 |
| 2,905,279 | 9/1959 | Moyer | 188—218 |
| 2,989,161 | 6/1961 | Diebold | 192—107 |

References Cited by the Applicant
UNITED STATES PATENTS

| 2,430,936 | 11/1947 | Kraft. |
| 2,835,355 | 5/1958 | Armstrong |
| 2,850,118 | 9/1958 | Byers. |
| 2,987,143 | 6/1961 | Colbertson et al. |

MILTON BUCHLER, Primary Examiner.
G. A. HALVOSA, Assistant Examiner.